United States Patent
Yu et al.

(10) Patent No.: US 12,416,558 B1
(45) Date of Patent: Sep. 16, 2025

(54) TEST DEVICE AND TEST METHOD FOR IMPACT RESISTANCE OF ANCHOR BODY

(71) Applicants: China University of Mining and Technology, Xuzhou (CN); Liaoning Technical University, Fuxin (CN); Liaoning University, Shenyang (CN)

(72) Inventors: Liyuan Yu, Xuzhou (CN); Minghe Ju, Xuzhou (CN); Dejun Liu, Fuxin (CN); Shuchen Li, Xuzhou (CN); Lianpeng Dai, Shenyang (CN); Haijian Su, Xuzhou (CN); Anye Cao, Xuzhou (CN); Xuwei Li, Xuzhou (CN); Chao Wei, Xuzhou (CN)

(73) Assignees: China University of Mining and Technology, Xuzhou (CN); Liaoning Technical University, Fuxin (CN); Liaoning University, Shenyang (CN)

( * ) Notice: Subject to any disclaimer, the term of this patent is extended or adjusted under 35 U.S.C. 154(b) by 0 days.

(21) Appl. No.: 19/208,103

(22) Filed: May 14, 2025

(51) Int. Cl.
G01N 3/307 (2006.01)
G01N 3/06 (2006.01)

(52) U.S. Cl.
CPC ............. G01N 3/307 (2013.01); G01N 3/066 (2013.01)

(58) Field of Classification Search
CPC ................................ G01N 3/30; G01N 3/307
See application file for complete search history.

(56) References Cited

U.S. PATENT DOCUMENTS

2016/0238498 A1* 8/2016 Silva Carceles ....... G01N 3/307

FOREIGN PATENT DOCUMENTS

| CN | 204754958 U | 11/2015 |
|---|---|---|
| CN | 204984456 U | 1/2016 |
| CN | 106525577 A | 3/2017 |
| CN | 211784865 U | 10/2020 |
| CN | 112539992 A | 3/2021 |
| CN | 112816347 A | 5/2021 |
| CN | 112816348 A | 5/2021 |
| CN | 114910344 A | 8/2022 |
| CN | 116086976 A | 5/2023 |

(Continued)

OTHER PUBLICATIONS

Zhu et al., A Test Device for Anchoring Structure of Anchor Rod Under Dynamic Load, Oct. 2020, FIT Machine Translation (Year: 2020).*

(Continued)

*Primary Examiner* — Erika J. Villaluna
(74) *Attorney, Agent, or Firm* — AVEK IP, LLC

(57) ABSTRACT

A test device and a test method for impact resistance of an anchor body are provided. The test device includes a workbench and a load-receiving steel frame. A support component is provided on the workbench, one end of the load-receiving steel frame is provided with a force-receiving plate, and the other end is provided with a tray. The tray is provided with an anchor rod located in the load-receiving steel frame. A steel pipe sleeved outside the anchor rod is movably provided in the load-receiving steel frame, and an end of the steel pipe is provided with a fixed rod passing through the tray. The fixed rod is movably connected to the tray, an end of the fixed rod is provided with a fixed base, the fixed rod is fixedly connected to the fixed base, and a buffering component is provided on the workbench.

6 Claims, 3 Drawing Sheets

(56) References Cited

FOREIGN PATENT DOCUMENTS

| | | |
|---|---|---|
| CN | 219015938 U | 5/2023 |
| CN | 118362278 A | 7/2024 |
| CN | 118533670 A | 8/2024 |

OTHER PUBLICATIONS

Decision to grant, dated Nov. 7, 2024, 3 pages, issued in Chinese Application No. 202411018343.0.
First Office Action, dated Aug. 27, 2024, 12 pages, issued in Chinese Application No. 202411018343.0.
Search report, dated Aug. 20, 2024, 6 pages, issued in Chinese Application No. 202411018343.0.
Search report, dated Oct. 28, 2024, 4 pages, issued in Chinese Application No. 202411018343.0.

* cited by examiner

TEST DEVICE AND TEST METHOD FOR IMPACT RESISTANCE OF ANCHOR BODY

CROSS-REFERENCE TO RELATED APPLICATIONS

This application claims priority to Chinese Patent disclosure No. 202411018343.0, filed on Jul. 29, 2024, the contents of which are hereby incorporated by reference.

TECHNICAL FIELD

The disclosure relates to the technical field of test device, in particular to a test device and a test method for impact resistance of an anchor body.

BACKGROUND

With the gradual development of coal resources, the mining depth of coal resources gradually develops from shallow to deep. The exploitation of deep coal resources is often accompanied by coal and rock dynamic disasters such as pressure bump, rock burst, and coal-and-gas outburst, which seriously threatens the safe production of mines. Pressure bump mainly occurs in roadway, and the prevention and control of pressure bump in roadways has always been a tough challenge in mitigating pressure bump. During roadway excavation, when the energy of bump is low, the roadway supported by anchor rod basically maintains its integrity. However, when the energy of bump is large, the roadway supported by anchor rod is prone to the fracture failure of supporting materials under dynamic load. The factors that affect the dynamic fracture failure of supporting materials mainly include steel strength, specifications, stress state, etc. Different factors have different effects on the mechanical properties of supporting materials.

Therefore, the detection of the anchor rods is particularly important. Currently, when detecting the anchor body, the detection method is single, and mostly involving direct striking of the anchor rod to observe and test the deformation degree of the anchor rod, which fails to intuitively understand the impact resistance of the anchor body from many aspects, and it is inconvenient to observe the deformation degree and impact resistance effect of the anchor rod, which affects the judgment of the impact resistance performance of the anchor rod.

SUMMARY

In order to facilitate the detection of the anchor rod, the disclosure provides a test device and a test method for impact resistance of an anchor body.

In the first aspect, a test device for impact resistance of an anchor body adopts the following technical solution.

The test device for impact resistance of an anchor body includes a workbench and a load-receiving steel frame. A support component is provided on the workbench for supporting the load-receiving steel frame, one end of the load-receiving steel frame is provided with a force-receiving plate and another end is provided with a tray, the tray is provided with an anchor rod located in the load-receiving steel frame; a steel pipe sleeved outside the anchor rod is movably provided in the load-receiving steel frame, an end of the steel pipe is provided with a fixed rod passing through the tray, the fixed rod is movably connected to the tray, an end of the fixed rod is provided with a fixed base, the fixed rod is fixedly connected to the fixed base, and a buffering component is provided on the workbench for buffering the fixed base. An anchor body structure is provided between the steel pipe and the anchor rod, and the anchor body structure is used for connecting the steel pipe and the anchor rod. A surface of the anchor rod is provided with multiple strain gauges, and a kinetic energy application generator is provided on the workbench for applying an impact force to the force-receiving plate.

By adopting the above-mentioned technical solution, the load-receiving steel frame is installed on the support component, the kinetic energy application generator is started, and an impact force towards the fixed base is applied to the force-receiving plate. The load-receiving steel frame drives the tray to move towards the fixed base, the tray pulls the anchor rod to move towards the fixed base, the steel pipe is fixedly connected to the fixed base. The anchor body structure between the steel pipe and the anchor rod simulates a concrete structure, The anchor rod that tends to move towards the fixed base is pulled away from the fixed base, so as to test the impact resistance of the anchor body. The deformation degree and stress situation of the anchor rod during the test are collected through the strain gauges on the anchor rod, which is convenient for the detection of the anchor rod.

In some embodiments, the anchor body structure includes a concrete layer and a resin cartridge, and the concrete layer is installed on an inner wall of the steel pipe, the resin cartridge is installed between the concrete layer and the anchor rod, and a length of the resin cartridge is smaller than a length of the anchor rod.

By adopting the above-mentioned technical solution, the concrete layer and the resin cartridge simulate the situation that the anchor rod is in the concrete, the length of the resin cartridge is smaller than that of the anchor rod, and a certain cavity is left between the resin cartridge and the anchor rod, which facilitates installation of the strain gauges on the surface of the anchor rod.

In some embodiments, a rod hole is formed in a middle of the tray, an end of the tray away from the load-receiving steel frame is provided with a connecting nut corresponding to the rod hole, an end of the anchor rod close to the tray is provided with threads corresponding to the connecting nut, and the anchor rod is in threaded connection with the connecting nut through the rod hole of the tray.

By adopting the above technical solution, the end of the anchor rod is in threaded connection with the connecting nut through the rod hole, so that the anchor rod is fixedly connected to the tray.

In some embodiments, the kinetic energy application generator includes a high-pressure gas cylinder, a barrel, an impact rod, an air pressure controller and an incident rod. The impact rod is located in the barrel, the high-pressure gas cylinder is in communication with the barrel, the barrel is provided with an air pressure controller for controlling a launch of the impact rod, and axes of the impact rod, the incident rod and the anchor rod are coincident.

By adopting the above technical solution, the launch of the impact rod in the barrel is controlled by the air pressure controller, the impact rod is launched to impact the incident rod, and the incident rod impacts the force-receiving plate, so as to exert the impact force on the force-receiving plate and the load-receiving steel frame in a direction towards the fixed base.

In some embodiments, the workbench is provided with a speedometer for detecting a speed of the impact rod.

By adopting the above technical solution, it is convenient to detect the speed of the impact rod launched in the barrel through the speedometer.

In some embodiments, an end of the incident rod close to the barrel is provided with a waveform shaper, and the strain gauges are installed on a surface of the incident rod.

By adopting the above technical solution, the waveform shaper changes the waveform of the stress wave transmitted into the incident rod through plastic deformation. When the impact rod impacts the incident rod at a certain speed, the load first acts on the waveform shaper made of a metal sheet, causing it to undergo plastic deformation. This deformation process leads to the increase of the pulse width of the loading wave and the extension of the rising time, thus making the rising process of the loading wave slower. Through the strain gauges on the surface of the incident rod, the tiny deformations on the surface of the incident rod are sensed, and these deformations are converted into changes in the resistance value.

In some embodiments, the support component includes a support frame, and a middle hole is formed in a middle of the support frame, and an inner diameter of the middle hole is larger than an outer diameter of the load-receiving steel frame.

By adopting the above technical solution, the load-receiving steel frame is supported by the support frame, which facilitates the movement of the load-receiving steel frame in the middle hole.

In some embodiments, the buffering component includes a damper, the damper is installed on the workbench, and the damper is connected to fixed base.

By adopting the above technical solution, the impact force received by the fixed base is buffered by the damper.

In a second aspect, the disclosure provides a test method for the impact resistance of the anchor body, which includes the following steps:

installing the load-receiving steel frame on the support component, orienting the force-receiving plate towards a direction of the kinetic energy application generator, and attaching the fixed base to the buffering component;

starting the kinetic energy application generator to apply the impact force to the force-receiving plate; and collecting deformation degree and stress situation of the anchor rod during the test through the strain gauges on the surface of the anchor rod.

To sum up, the disclosure includes at least one of the following beneficial technical effects.

The load-receiving steel frame is installed on the support component, and the kinetic energy application generator is started to apply the impact force to the force-receiving plate in the direction towards the fixed base. The load-receiving steel frame drives the tray to move in the direction towards the fixed base, and the tray pulls the anchor rod to move in the direction towards the fixed base. The steel pipe is fixedly connected to the fixed base, and the anchor body structure between the steel pipe and the anchor rod simulates the concrete structure. The anchor rod which tends to move towards the fixed base is pulled away from the fixed base, so as to test the impact resistance of the anchor body. The deformation degree and stress situation of the anchor rod during the test are collected through the strain gauges on the anchor rod, which is convenient for the detection of the anchor rod.

The waveform shaper changes the waveform of the stress wave transmitted into the incident rod by producing plastic deformation. When the impact rod impacts the incident rod at a certain speed, the load first acts on the waveform shaper made of a metal sheet, causing it to undergo plastic deformation. This deformation process leads to the increase of the pulse width of the loading wave and the extension of the rising time, thus making the rising process of the loading wave slower. Through the strain gauges on the surface of the incident rod, the tiny deformations on the surface of the incident rod are sensed, and these deformations are converted into changes in the resistance value.

DETAILED DESCRIPTION OF THE EMBODIMENTS

The present disclosure will be further described in detail with reference to all the attached drawings.

The embodiment of the disclosure discloses a test device for impact resistance of an anchor body.

Figure 1:
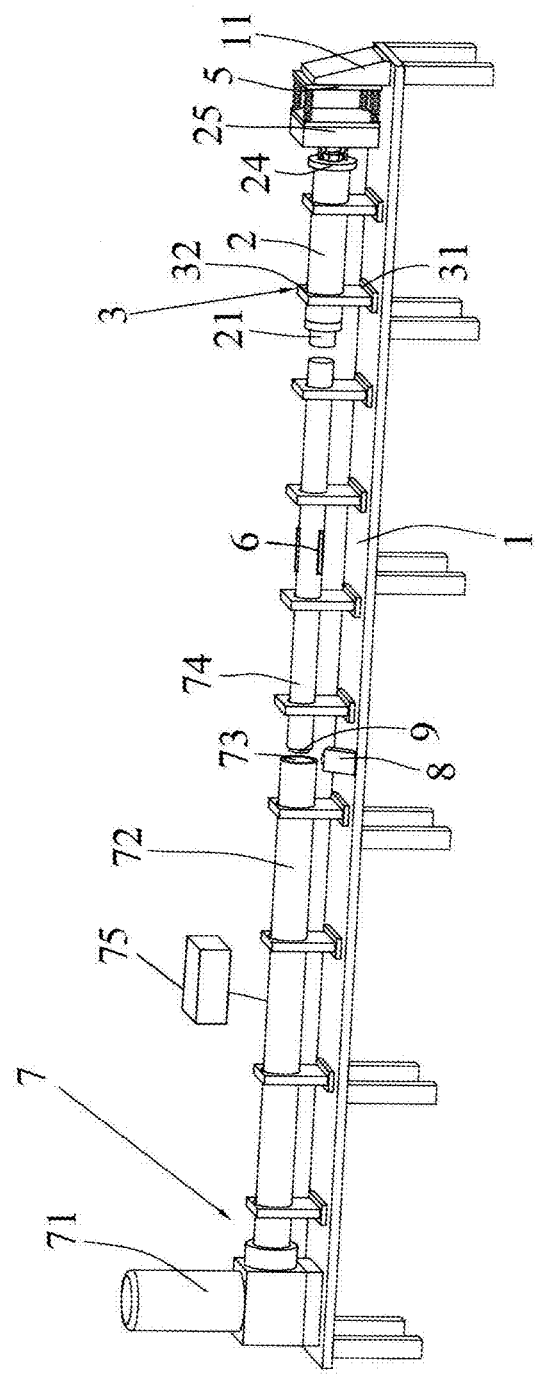
FIG. 1 is a schematic diagram of the overall structure of a test device for impact resistance of an anchor body.

Referring to FIG. 1, the test device for the impact resistance of the anchor body includes a workbench 1 and a load-receiving steel frame 2. The workbench 1 is provided with a support component 3 for supporting the load-receiving steel frame 2. The support component 3 includes a support frame 31, and a middle hole 32 is formed in the middle of the support frame 31. The load-receiving steel frame 2 is located in the middle hole 32, and the inner diameter of the middle hole 32 is larger than the outer diameter of the load-receiving steel frame 2. The load-receiving steel frame 2 is supported by the support frame 31, which facilitates the movement of the load-receiving steel frame 2 in the middle hole 32.

Figure 2:
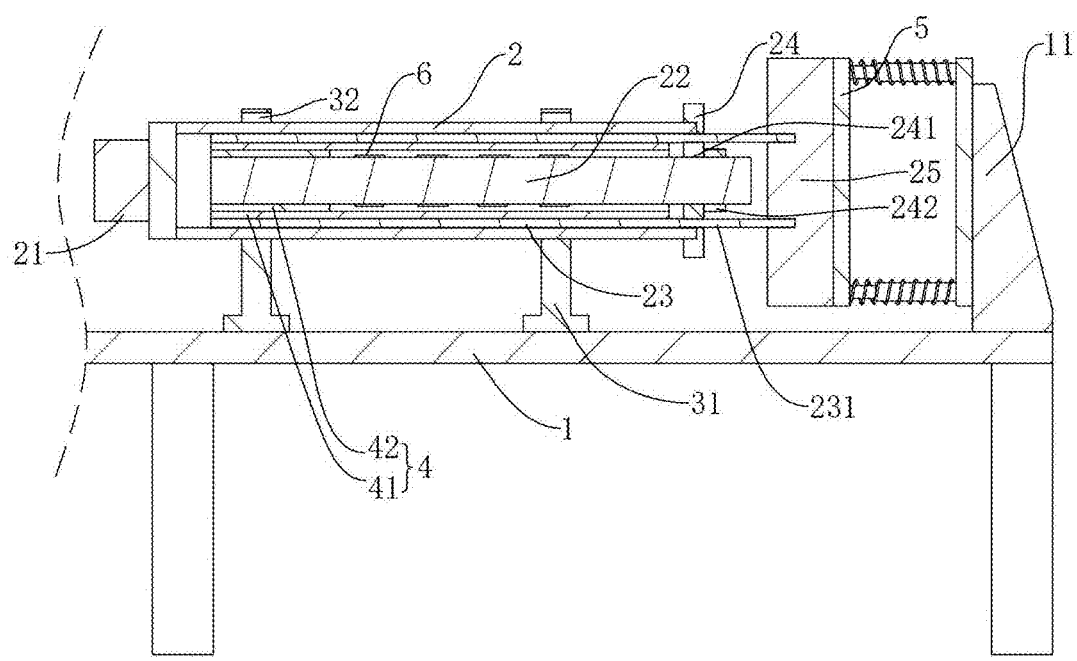
FIG. 2 is a schematic diagram of the internal structure of the load-receiving steel frame in the embodiment of the present disclosure.

Referring to FIG. 1 and FIG. 2, one end of the load-receiving steel frame 2 is fixedly connected to a force-receiving plate 21, and the other end is provided with a tray 24, on which an anchor rod 22 located in the load-receiving steel frame 2 is installed. A rod hole 241 is formed in the middle of the tray 24, and the end, away from the load-receiving steel frame 2, of the tray 24 is fixedly connected to a connecting nut 242 corresponding to the rod hole 241. The end, near the tray 24, of the anchor rod 22 is provided with threads corresponding to the connecting nut 242, the anchor rod 22 is in threaded connection with the connecting nut 242 through the rod hole 241 of the tray 24. The end of the anchor rod 22 is in threaded connection with the connecting nut 242 through the rod hole 241, thereby fixedly connecting the anchor rod 22 with the tray 24.

Referring to FIG. 2, a steel pipe 23 sleeved outside the anchor rod 22 is movably arranged in the load-receiving steel frame 2. The end of the steel pipe 23 is fixedly connected to a fixed rod 231 passing through the tray 24, the fixed rod 231 is movably connected to the tray 24, and the end of the fixed rod 231 is fixedly connected to the fixed base 25. The workbench 1 is provided with a buffering component for buffering the fixed base 25. The buffering component includes a damper 5, the damper 5 is installed on the workbench 1, the damper 5 is connected to the fixed base 25, and the impact force received by the fixed base 25 is buffered by the damper 5. The workbench 1 is provided with a fixed frame 11 located at the side, away from the fixed base 25, of the damper 5, and the fixed frame 11 is connected to the damper 5.

Referring to FIG. 2, an anchor body structure 4 is arranged between the steel pipe 23 and the anchor rod 22, the anchor body structure 4 is used to connect the steel pipe 23 and the anchor rod 22. The anchor body structure 4 includes a concrete layer 41 and a resin cartridge 42. The concrete layer 41 is installed on the inner wall of the steel pipe 23, and the resin cartridge 42 is installed between the concrete layer 41 and the anchor rod 22. The length of resin cartridge 42 is less than that of anchor rod 22. The diameter of anchor rod 22 is 20 mm, the combined outer diameter of anchor rod 22 and resin cartridge 42 is 38 mm, and the thickness of the concrete layer 41 is 11 mm. The steel pipe 23 has an inner diameter of 60 mm and an outer diameter of 80 mm.

The concrete layer 41 and the resin cartridge 42 simulate the situation that the anchor rod 22 is in concrete. The length of the resin cartridge 42 is shorter than that of the anchor rod 22, and a certain cavity is left between the resin cartridge 42 and the anchor rod 22, which is convenient for installing the strain gauges 6 on the surface of the anchor rod 22. The positions where the anchor rod 22 is connected to the resin cartridge 42 are anchoring sections, the positions where the anchor rod 22 is not connected to the resin cartridge 42 are free sections, and the length of the free sections is three times that of the anchoring sections. Multiple strain gauges 6 are installed on the surface of the free sections of the anchor rod 22. The number of strain gauges 6 is even. In this embodiment, the specific number of strain gauges 6 is eight, and the eight strain gauges 6 are symmetrically stuck on two sides of the anchor rod 22 to eliminate the bending effect of the anchor rod 22.

The strain gauges 6 are connected to a strain meter. The strain gauges 6 can sense the tiny deformations on the surface of the anchor rod 22 and convert these deformations into changes in resistance value. When the anchor rod 22 is subjected to a collision test, compression stress waves will be generated, and these stress waves will propagate in the anchor rod 22, resulting in tiny deformations on the surface of the anchor rod 22. The strain gauges 6 can capture these deformations and convert them into electrical signals for recording.

Referring to FIG. 1, a kinetic energy application generator 7 for applying an impact force to the force-receiving plate 21 is arranged on the workbench 1. The kinetic energy application generator 7 includes a high-pressure gas cylinder 71, a barrel 72, an impact rod 73, an air pressure controller 75 and an incident rod 74. The barrel 72 has a length of 2.5 m, an outer diameter of 150 mm and an inner diameter of 100 mm. The impact rod 73 is located in the barrel 72. The impact rod 73 has a diameter of 100 mm and a length of 400 mm. The high-pressure gas cylinder 71 is in communication with the barrel 72, and the barrel 72 is equipped with the air pressure controller 75 for controlling the launch of the impact rod 73. The incident rod 74 is located between the impact rod 73 and the load-receiving steel frame 2. The length of the incident rod 74 is 1800 mm, and the diameter is 100 mm. Both the incident rod 74 and the impact rod 73 are made of alloy steel. The axes of the impact rod 73, the incident rod 74 and the anchor rod 22 coincide. The air pressure controller 75 controls the launch of the impact rod 73 in the barrel 72, the impact rod 73 is launched to impact the incident rod 74, the incident rod 74 hits the force-receiving plate 21, thus exerting the impact force on the force-receiving plate 21 and the load-receiving steel frame 2 towards the fixed base 25.

Referring to FIG. 1, a speedometer 8 for detecting the speed of the impact rod 73 is installed on the workbench 1, which is convenient for detecting the speed of the impact rod 73 fired in the barrel 72.

With reference to FIG. 1, the waveform shaper 9 is installed at the end of the incident rod 74 near the barrel 72, and the waveform shaper 9 changes the wave shape of the stress wave transmitted into the incident rod 74 by producing plastic deformation. When the impact rod 73 impacts the incident rod 74 at a certain speed, the load first acts on the waveform shaper 9 made of metal sheet, causing it to undergo plastic deformation. This deformation process leads to the increase of the pulse width of the loading wave and the extension of the rising time, thus making the rising process of the loading wave slower. Through the strain gauges 6 on the surface of the incident rod 74, and tiny deformations of the surface of the incident rod 74 are sensed by the strain gauges 6 on the surface of the incident rod 74, and these deformations are converted into changes in resistance value.

The implementation principle of the test device for the impact resistance of the anchor body in the embodiment of this disclosure is as follows. The load-receiving steel frame 2 is installed on the support frame 31, the kinetic energy application generator 7 is started, and an impact force is applied to the force-receiving plate 21 towards the fixed base 25, and the load-receiving steel frame 2 drives the tray 24 to move towards the fixed base 25, and the tray 24 pulls the anchor rod 22 to move towards the fixed base 25. The steel pipe 23 is fixedly connected to the fixed base 25, and the anchor body structure 4 between the steel pipe 23 and the anchor rod 22 simulates the concrete structure. The anchor rod 22, which tends to move towards the fixed base 25, is pulled away from the fixed base 25, so as to test the impact resistance of the anchor body. The strain gauges 6 on the anchor rod 22 collects the deformation degree and stress situation of the anchor rod 22 during the test, which is convenient for the detection of the anchor rod 22.

Figure 3:
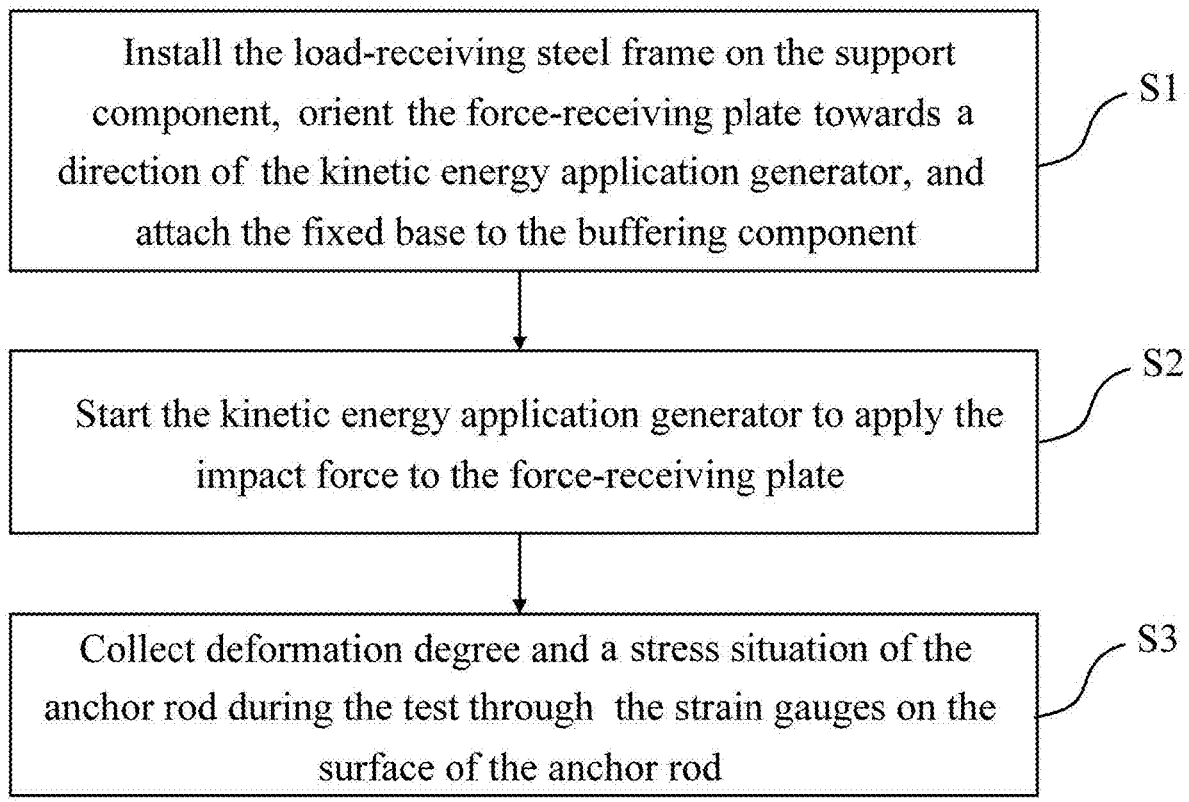
FIG. 3 is a flowchart of a test method for impact resistance of the anchor body.

The disclosure further provides a test method for the impact resistance of the anchor body, as shown in FIG. 3, which includes the following steps.

S1, the load-receiving steel frame 2 installed on the support component 3, the force-receiving plate 21 is oriented towards the kinetic energy application generator 7, and the fixed base 25 is attached to the buffering component.

S2, the kinetic energy application generator 7 is started to apply the impact force to the force-receiving plate 21.

S3, deformation degree and stress situation of the anchor rod 22 is collected during the test through the strain gauges 6 on the surface of the anchor rod 22.

The above are the preferred embodiments of this disclosure, and the scope of protection of this disclosure is not limited accordingly. Therefore, all equivalent changes made according to the structure, shape and principle of this disclosure should be included in the scope of protection of this disclosure.

What is claimed is:

1. A test device for impact resistance of an anchor body, comprising a workbench, and further comprising a load-receiving steel frame;
   wherein a support component is provided on the workbench for supporting the load-receiving steel frame, one end of the load-receiving steel frame is provided with a force-receiving plate and another end is provided with a tray, and wherein the tray is provided with an anchor rod located in the load-receiving steel frame; a steel pipe sleeved outside the anchor rod is movably provided in the load-receiving steel frame, an end of the steel pipe is provided with a fixed rod passing through the tray, the fixed rod is movably connected to the tray, an end of the fixed rod is provided with a fixed base, the fixed rod is fixedly connected to the fixed base, and a buffering component is provided on the workbench for buffering the fixed base, wherein the buffering component comprises a damper, and wherein the damper is installed on the workbench, and the damper is connected to the fixed base;

an anchor body structure is provided between the steel pipe and the anchor rod, and the anchor body structure is used for connecting the steel pipe and the anchor rod, wherein the anchor body structure comprises a concrete layer and a resin cartridge, and wherein the concrete layer is installed on an inner wall of the steel pipe, the resin cartridge is installed between the concrete layer and the anchor rod, and a length of the resin cartridge is smaller than a length of the anchor rod; and a surface of the anchor rod is provided with a plurality of strain gauges, and a kinetic energy application generator is provided on the workbench for applying an impact force to the force-receiving plate, wherein the kinetic energy application generator comprises a high-pressure gas cylinder, a barrel, an impact rod, an air pressure controller and an incident rod, and wherein the impact rod is located in the barrel, the high-pressure gas cylinder is in communication with the barrel, the barrel is provided with the air pressure controller for controlling a launch of the impact rod; axes of the impact rod, the incident rod and the anchor rod are coincident, the launch of the impact rod in the barrel is controlled by the air pressure controller, and wherein the impact rod is launched to impact the incident rod, and the incident rod impacts the force-receiving plate, so as to exert the impact force on the force-receiving plate and the load-receiving steel frame in a direction towards the fixed base.

2. The test device for the impact resistance of the anchor body according to claim 1, wherein a rod hole is formed in a middle of the tray, an end of the tray away from the load-receiving steel frame is provided with a connecting nut corresponding to the rod hole, an end of the anchor rod close to the tray is provided with threads corresponding to the connecting nut, and the anchor rod is in threaded connection with the connecting nut through the rod hole of the tray.

3. The test device for the impact resistance of the anchor body according to claim 1, wherein the workbench is provided with a speedometer for detecting a speed of the impact rod.

4. The test device for the impact resistance of the anchor body according to claim 1, wherein an end of the incident rod close to the barrel is provided with a waveform shaper, and the strain gauges are installed on a surface of the incident rod.

5. The test device for the impact resistance of the anchor body according to claim 1, wherein the support component comprises a support frame, a middle hole is formed in a middle of the support frame, and an inner diameter of the middle hole is larger than an outer diameter of the load-receiving steel frame.

6. A test method for the impact resistance of the anchor body, applied to the test device for the impact resistance of the anchor body according to claim 1, comprising following steps:

installing the load-receiving steel frame on the support component, orienting the force-receiving plate towards a direction of the kinetic energy application generator, and attaching the fixed base to the buffering component;

starting the kinetic energy application generator to apply the impact force to the force-receiving plate; and collecting deformation degree and a stress situation of the anchor rod during the test through the strain gauges on the surface of the anchor rod.

* * * * *